(12) United States Patent
Beilin et al.

(10) Patent No.: US 8,972,772 B2
(45) Date of Patent: Mar. 3, 2015

(54) SYSTEM AND METHOD FOR DUPLEXED REPLICATED COMPUTING

(75) Inventors: Samuel Beilin, Brighton, MA (US); David Crane, Somerville, MA (US); M. Jay Prizant, Needham, MA (US); Eric T. Antelman, Hudson, MA (US); Jeffrey Zinchuk, Medway, MA (US); Roger Racine, Wayland, MA (US); Neil Brock, Acton, MA (US); Adam J. Elbirt, Ashland, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 1027 days.

(21) Appl. No.: 13/033,810

(22) Filed: Feb. 24, 2011

(65) Prior Publication Data
US 2012/0221889 A1     Aug. 30, 2012

(51) Int. Cl.
G06F 11/00    (2006.01)
G06F 11/16    (2006.01)
G06F 11/18    (2006.01)

(52) U.S. Cl.
CPC ........ G06F 11/1604 (2013.01); G06F 11/1679 (2013.01); G06F 11/181 (2013.01)
USPC ........................................................ 714/4.2

(58) Field of Classification Search
CPC .............. G06F 2201/88; G06F 11/348; G06F 15/17381
USPC ........................................................ 714/4.2
See application file for complete search history.

(56) References Cited

U.S. PATENT DOCUMENTS

| | | | |
|---|---|---|---|
| 4,907,232 A | | 3/1990 | Harper et al. |
| 5,404,363 A | * | 4/1995 | Krause et al. ................. 714/814 |
| 6,411,633 B1 | | 6/2002 | Wolf |
| 6,550,018 B1 | | 4/2003 | Abonamah et al. |
| 2002/0164952 A1 | * | 11/2002 | Singhal et al. .................. 455/41 |
| 2004/0090962 A1 | * | 5/2004 | Forest et al. .................. 370/392 |
| 2007/0188358 A1 | * | 8/2007 | Somayajula .................... 341/51 |
| 2009/0055676 A1 | * | 2/2009 | Wiebe .......................... 713/501 |

FOREIGN PATENT DOCUMENTS

WO    WO-93/11489 A1    6/1993
WO    WO-98/55923 A2    12/1998

OTHER PUBLICATIONS

International Search Report in PCT/US2012/026342 dated Jun. 21, 2012.

* cited by examiner

*Primary Examiner* — Scott Baderman
*Assistant Examiner* — Jigar Patel
(74) *Attorney, Agent, or Firm* — Foley & Lardner LLP; Edward A. Gordon

(57) ABSTRACT

Systems and methods are disclosed herein for a replicated duplex computer system. The system includes a triplet of network elements, which each maintain a clock signal, and a monitor at each network element for monitoring incoming clock signals. Each network element interfaces with a fault containment region (FCR). The system provides the ability to transition to a duplex system if one of the fault containment regions fails. The three network elements are able to send their clock signals to the other network elements and receive their own clock signal and clock signals from the other elements. The monitors are configured to detect discrepancies in the clock signals of the network elements. If a monitor determines that an FCR has failed, each network element is reconfigured so that the FTPP system operates in a duplex mode without the faulty FCR by replacing the clock signal from the faulty element with its own clock signal.

25 Claims, 5 Drawing Sheets

SYSTEM AND METHOD FOR DUPLEXED REPLICATED COMPUTING

FIELD OF INVENTION

The invention relates generally to computer systems, and more particularly to systems and methods for replicated fault tolerant computing for allowing the operation of a replicated duplexed system.

BACKGROUND OF THE INVENTION

With the rapid technological developments in areas such as aviation, space travel, robotics, medical devices, and electronic financial systems, there is an increasing need for computer systems to be reliable and resilient to failure. Thus, there is an ever growing demand for reliable computing systems. Replicated computers executing identical operations can provide fault tolerance by comparing the outputs of each of the computers and determining which one of the computers may have generated an error during operation.

The fault tolerant parallel processor (FTPP) architecture provides replicated operation of commercial-off-the-shelf processing elements. This is accomplished by providing synchronization and data integrity services in a special purpose communication device called a network element, which links replicated processors and other elements in fault containment regions to the rest of the FTTP system. Currently, one of two canonical forms of reaching agreement in the presence of faults is used within the FTPP architecture: interactive convergence and interactive consistency.

Interactive convergence algorithms reach an agreement on a correct value by performing an average on the locally perceived values. The locally perceived values may be different for each observer, but the algorithm converges, within a known error bound, to the same result across all properly functioning observers. The benefit of convergence compared to interactive consistency is reduced rounds of communication.

Interactive consistency algorithms guarantee that all properly functioning observers see the same values and can then perform a value selection from identical data sets. The cost of removing the averaging error compared to an interactive convergence algorithm is increased rounds of communication.

In a triplex system, which consists of three network elements and fault containment regions, interactive convergence algorithms do not have the resources needed to operate. Oral message versions of interactive consistency algorithms can be replaced by signed message versions for the triplex system to operate in Byzantine fault scenarios. However, once one of the fault containment regions fails leaving only two functional fault containment regions, an FTPP system historically could not continue to operate as a duplex system.

SUMMARY OF THE INVENTION

Therefore, there is a need in the art for a replicated parallel processing system that is able to operate in a duplex mode. Accordingly, systems and methods are disclosed herein for a replicated duplex computer system. The system includes a triplet of network elements, which each maintain a clock signal, and a monitor at each network element for monitoring incoming clock signals. Each network element interfaces with a fault containment region (FCR); herein, the network element may also be considered an element of a fault containment region. The system provides the ability to transition to a duplex system if one of the fault containment regions fails. The three network elements are able to send their clock signals to the other network elements and receive their own clock signal and clock signals from the other elements. The monitors are configured to detect discrepancies in the clock signals of the network elements. If a monitor determines that an FCR has failed, each network element is reconfigured so that the FTPP system operates in a duplex mode without the faulty FCR by replacing the clock signal from the faulty element with its own clock signal.

In some embodiments, each network element interfaces with a general purpose processor. The processors may be configured to execute identical operations. The processors may be further configured to communicate with other network elements' processors by transmitting and receiving messages. In one embodiment, a processor associated with one network element is different from a processor associated with another network element.

In one embodiment, the network elements are configured to maintain synchronization with the other network elements. The monitor at each network element may be configured to observe at least one metric, such as a frequency or a duty cycle, of the received clock signals. The monitor may be in communication with a software registry.

In one embodiment, the clock signal inputs are slightly offset from each other. This offset may be on the order of 80 nanoseconds. In another embodiment, the network elements further comprise an output buffer, such as a first-in, first-out buffer.

BRIEF DESCRIPTION OF THE DRAWINGS

The system and method may be better understood from the following illustrative description with reference to the following drawings in which.

DESCRIPTION OF CERTAIN ILLUSTRATIVE EMBODIMENTS

To provide an overall understanding of the invention, certain illustrative embodiments will now be described, including systems and methods for duplex replicated computing. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
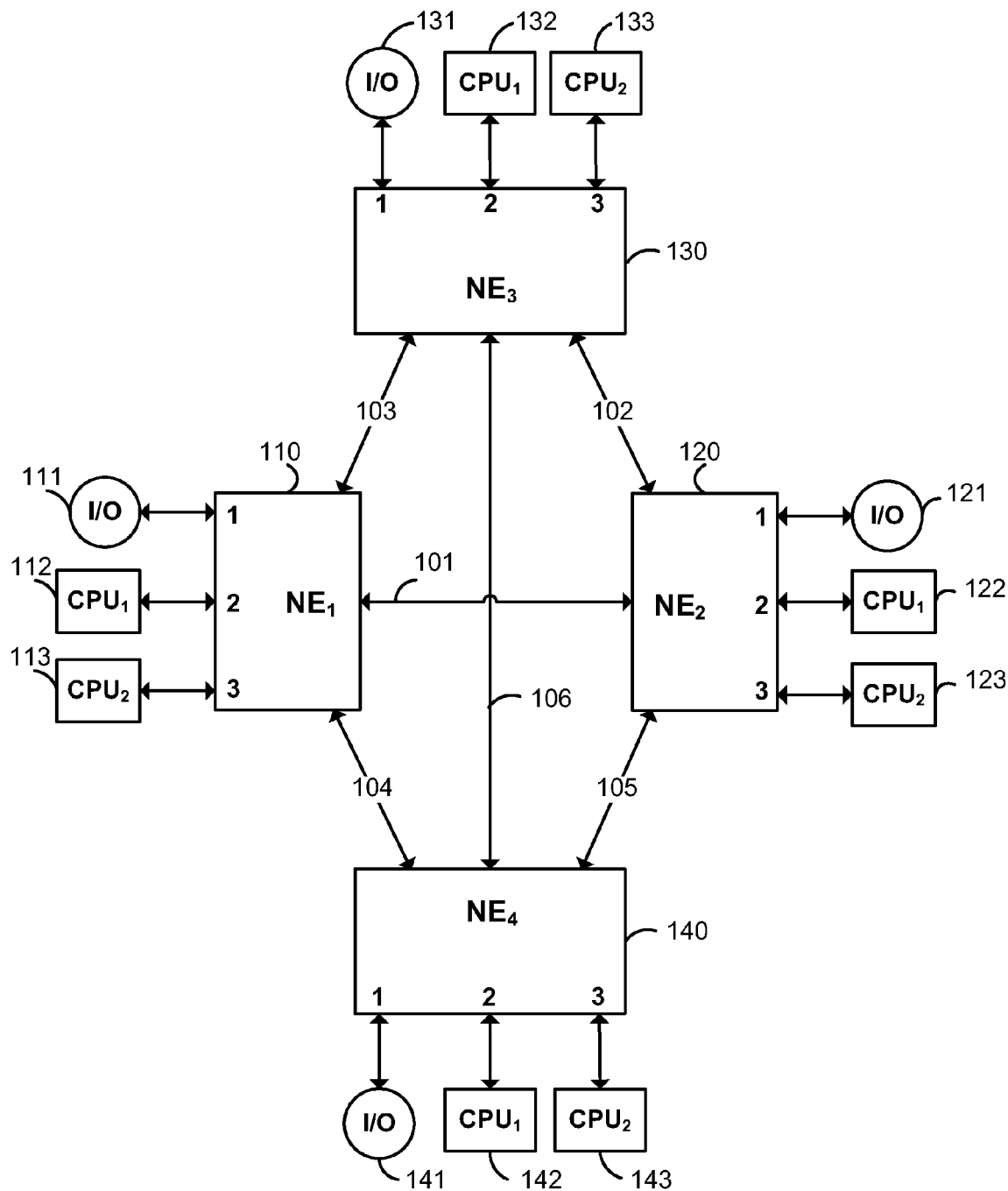
FIG. 1 is block diagram of a quadriplex system for replicated, fault tolerant computing, according to an illustrative embodiment of the invention.

FIG. 1 shows a quadriplex system 100 for replicated, fault tolerant computing, according to an illustrative embodiment of the invention. Fault tolerant computer (FTC) systems are designed to continue operating properly in the event of a failure of one or more components. FTC systems can be robust to several possible types of failures, including but not limited to hard disk failures, input or output device failures, software bugs and errors, interface errors, operator errors, bad command sequences, and physical damage. FTC systems are useful in machines built to last a long time without any maintenance, such as space systems; computers that must be very dependable and require constant monitoring, such as monitor and control computers for nuclear power plants or supercollider experiments; and computer with high runtimes and heavy use, such as supercomputers for probability monitoring. However, the computer system disclosed herein is not limited to these types of applications.

The quadriplex system 100 comprises four fault containment regions (FCRs) operating in parallel, all in direct communication with each other. The fault tolerance is provided by replication; each network element executes the same tasks and sends its results to a voting circuit (not shown), which chooses the correct result based on a quorum. If one of the FCRs has a failure, it may return a result that is different from the results returned by the other FCRs. When the voting circuit compares the results, it determines that the result provided by the majority of the FCRs, in this case the other three FCRs, is correct. The quadriplex system 100 is tolerant to most types of faults, including Byzantine faults, as are higher-order systems, such as quintplex (five FCRs) and up.

For the parallel computing and voting circuit to function properly, the network elements must be properly aligned in time. It is known in the art for each network element to produce a clock signal, compare its own clock signal with the clock signals from the other network elements, and synchronize its clock signal with the other clock signals. The direct communication links, labeled 101 through 106 in FIG. 1, between the network elements are used to transmit the clock signals among the network elements. Each network element knows the delay of each communication link connected to it so that it can correct for the delays when comparing the clock signals.

The first network element bus 110 is operably connected to at least one input/output (I/O) system 111 and two processing elements 112 and 113 ($CPU_1$ and $CPU_2$, respectively). The processing units perform different functions; for example, $CPU_1$ 112 may be a synchronization processor configured to compare clock signals and synchronize its clock the clock signals from the other network elements. $CPU_2$ 113 may be configured to execute external requests that are performed by each $CPU_2$ 113, 123, 133, and 143 in parallel. Additional processing units may be connected to each network element bus. The processing elements associated with network elements 110, 120, 130, and 140 may be the same or different. For example, one network element may be associated with a third processing element to execute a task that does not require redundancy or replication. In another embodiment, processing element 113, which is configured to execute the external requests, may be different from at least one of processing elements 123, 133, and 143. This creates a diverse system, wherein multiple different implementations are utilized so that the system is robust if there is a failure in a specific implementation (in this case, a specific processor). Any of the processing elements may be in direct or indirect communication with any processing elements of other FCRs.

The I/O system 111 may include one or more elements (e.g. modem, Ethernet device, wifi device, disk drive, screen, touchscreen, mouse, keyboard, microphone, printer, etc.) for receiving information from and transmitting information to the FTPP system, a human operator, or an external system. One input is a request to execute a task. The corresponding output is the result from this task, which would be communicated to the voting circuit. The output may also be displayed on a monitor, or sent to a central monitoring system for reporting or displaying the outputs of all FCRs. In this embodiment, one or more I/O elements may be connected to multiple network element buses; for example, a single keyboard may be connected to all network elements 110, 120, 130, and 140, so that instructions entered by an operator via a keyboard are sent directly to each FCR. The I/O system 111 may be used by a system monitor or an automatic system for debugging the FCR. The elements of I/O systems 111, 121, 131, and 141 need not be identical; for example, I/O system 111 may include an I/O device used on performing a function not performed by the other FCRs. The I/O system may further comprise a buffer, e.g. a first-in, first-out buffer, for storing received messages or messages to be sent.

Figure 2:
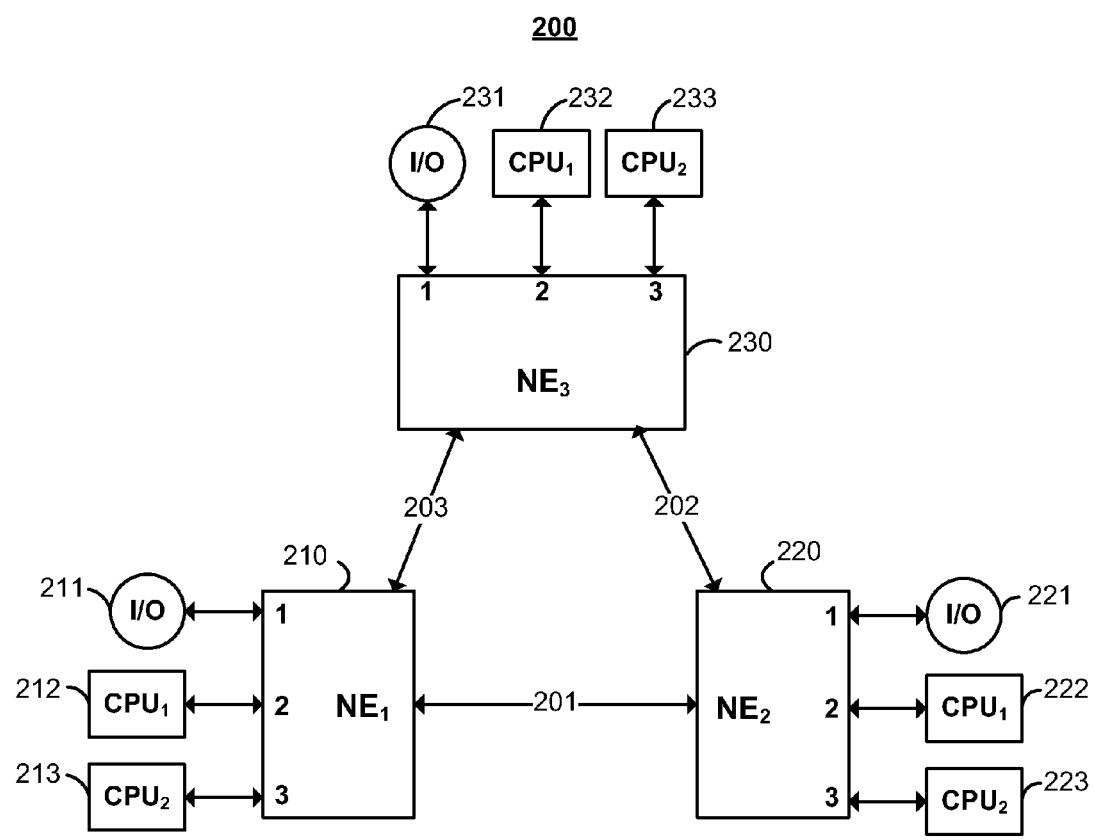
FIG. 2 is block diagram of a triplex system for replicated, fault tolerant computing, according to an illustrative embodiment of the invention.

FIG. 2 shows a triplex system 200 for replicated, fault tolerant computing, according to an illustrative embodiment of the invention. FIG. 2 consists of network elements 210, 220, and 230, which are similar to network elements 110, 120, and 130, respectively, of FIG. 1. If any FCR, in this case the FCR associated with network element 140, of the quadriplex system 100 experiences a fault or failure that cannot be resolved or corrected, then to conserve resources, the faulty FCR may be disabled or shut down, leaving a triplex system. Even if the faulty FCR is still operating, it is ignored by the voting circuit and clock signal processors at the remaining network elements, creating the triplex system 200 for use in the replicated processing and voting procedure. Historically, a triplex system is not tolerant to any additional faults. By relaxing the constraint of full Byzantine resilience or substituting a signed message interactive consistency algorithm, the triplex system can in some cases tolerate an additional fault. Furthermore, using the clock signals discussed with relation to FIGS. 3 through 5, the FTC system can continue to maintain synchronization and function properly in the duplex mode of operation.

Figure 3:
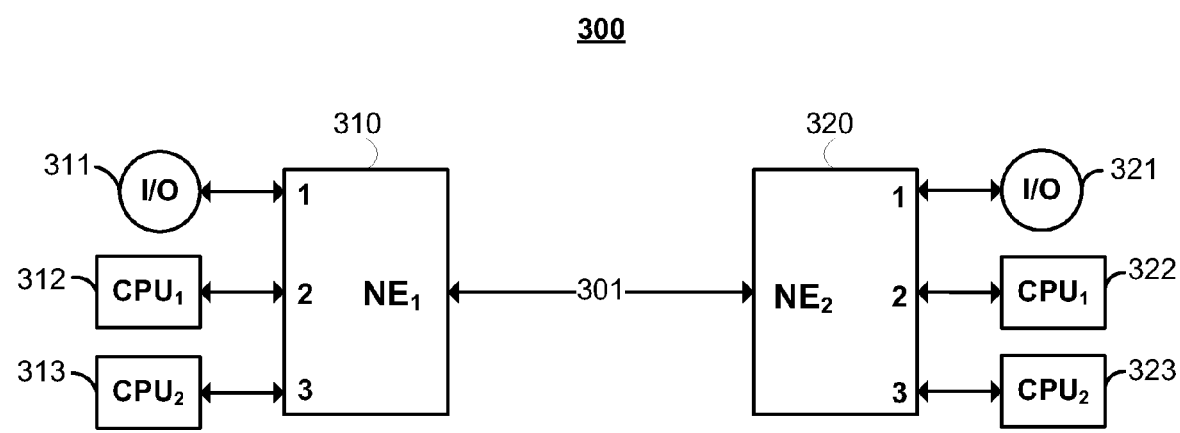
FIG. 3 is block diagram of a duplex system for replicated computing, according to an illustrative embodiment of the invention.

FIG. 3 shows a duplex system 300 for replicated computing, according to an illustrative embodiment of the invention. The duplex system 300 consists only of network elements 310 and 320, which are similar to network elements 210 and 220, respectively, from FIG. 2. If any FCR, in this case the FCR associated with network element 230 from the triplex system 200, experiences a fault or a failure, a triplex system is reduced to a duplex system. The duplex system 300 is no longer fault tolerant: if one of the FCRs fails, there will be only a single network element still functioning, making parallel computing impossible. However, the voting circuit (not shown) of the duplex system 300 is able to detect faults, so running in duplex mode still provides confirmation that the FCRs are not faulty. For the self-checking pair to operate properly, their clock signals must still be aligned. The method for transitioning into and operating in duplex mode is discussed in detail in relation to FIGS. 4 and 5.

Figure 4:
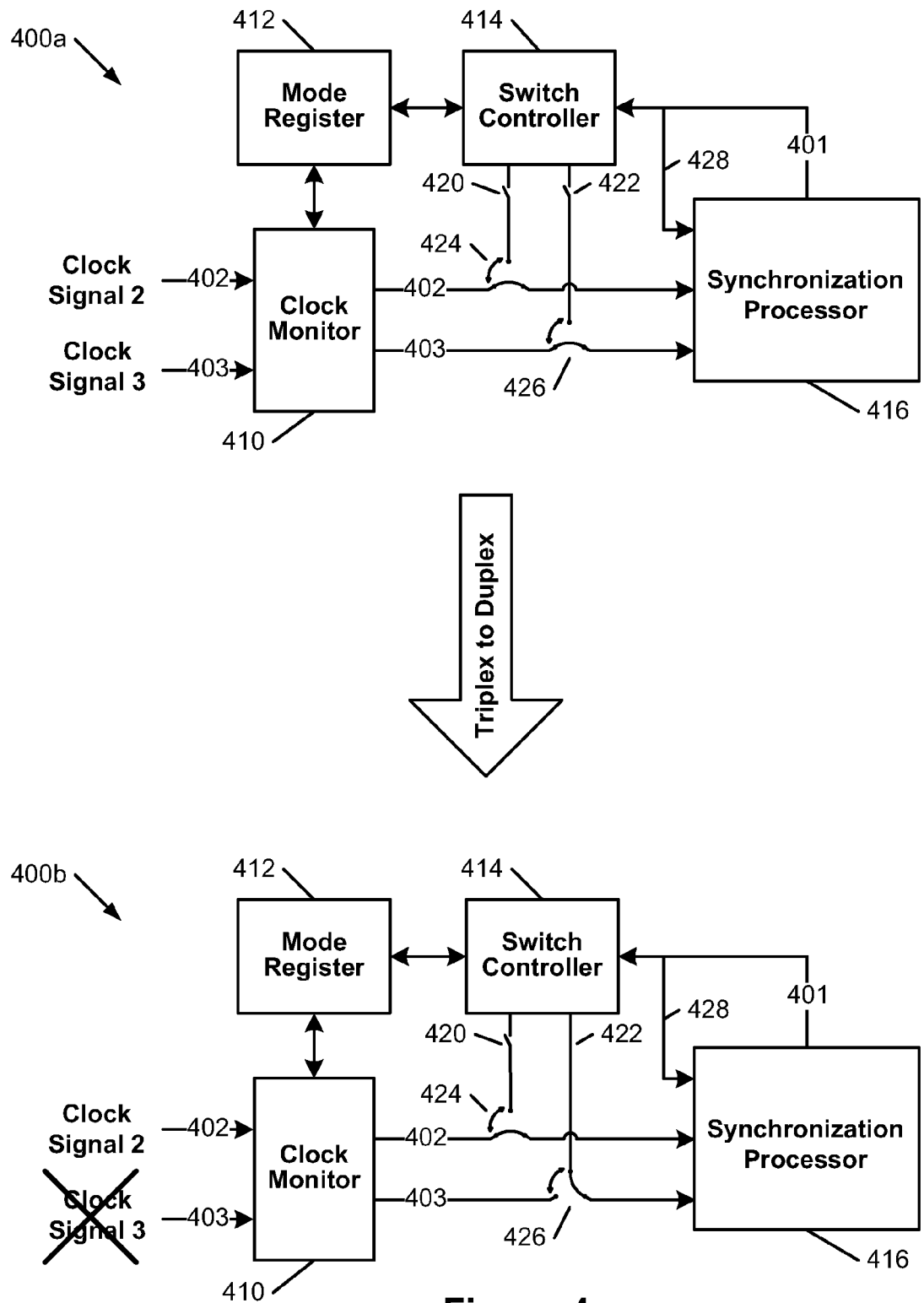
FIG. 4 is a block diagram showing the transition of a single network element from a fault-tolerant, replicated triplex operation state to a replicated duplex operation state, according to an illustrative embodiment of the invention.

FIG. 4 is a block diagram showing how a single operational network element 400 transitions when a fault-tolerant, replicated triplex computing system is reduced to a replicated duplex system, according to an illustrative embodiment of the invention. The network element 400 comprises a clock monitor 410, a mode register 412, a switch controller 414, and synchronization circuitry 416. These elements may be implemented in an application-specific integrated circuit (ACIS) or a field-programmable gate array (FPGA). While in triplex operation state 400a, the clock monitor 410 receives incoming external clock signals from other clocks. Network element 1 is shown in FIG. 4, so the clock monitor receives clock signals 2 (labeled 402) and 3 (labeled 403) from network elements 2 and 3, respectively. In triplex mode, network element 2 receives external clock signals 1 and 3, while network element 3 receives external clock signals 1 and 2. After receiving the clock signals, the clock monitor 410 calculates and analyzes signal metrics, such as clock signal frequency and duty time. The clock frequency may be in the range 1 kHz to 40 MHz. In one embodiment, duty cycle is 50%, but the duty cycle may range from nearly 0% to nearly 100%, as long as the frequency is detectable. If one of these signal metrics varies from its expected value (e.g. frequency is too high or low or duty time is too high or too low), the clock monitor identifies that the clock signal has failed. The status of the clock monitors is stored in the mode register 412. The mode register 412 may also store the current mode of operation (e.g. duplex, triplex, quadriplex, etc.), which network elements are operational, or any other information. The mode register 412 may also be connected to a software register (not shown). In one embodiment, each incoming clock signal passes through a different, independent clock monitor, and all of the clock monitors are in communication with the mode register. If the clock monitor 410 determines that a clock signal is faulty, the clock monitor, the mode register, or another element alerts the other network elements of the failure. The system-wide transition from triplex to duplex is described in greater detail with respect to FIG. 5.

Switch controller 414 controls the positions of switches 420, 422, 424, and 426, which route the clock signals in different configurations based on which FCRs are operable. In some embodiments, switch controller 414 controls only switches 420 and 422, while the mode register 412 controls three-way switches 424 and 426. The mode register 412 may store or determine the switch positions for each configuration. Alternatively, the mode register 412 stores only whether or not each FCR is functional, and the switch controller 414 determines the correct switch pattern. In either embodiment, the switch controller 414 is in communication with the mode register 412, as shown. In addition, the switch controller receives the internal clock signal 401 from the synchronization circuitry 416. As will be described in relation to 400b, the internal clock signal sent to the switch controller 414 will be used in duplex operation. However, in triplex mode, as both switches 420 and 422 in the lines out of the switch controller are open, the clock signal 401 passed to the switch controller is not routed any farther. The three-way switches 424 and 426 are in their default states, allowing external clock signals 402 and 403 to pass through switches 424 and 426, respectively, to the synchronization circuitry 416. Although FIG. 4 shows only two external lines into the clock monitor, out of the clock monitor, and into the synchronization circuitry, there may be more lines not shown here that could be used for higher-order FTC systems, such as the quadriplex system shown in FIG. 1.

As seen in 400a, the synchronization circuitry receives external clock signals 402 and 403 and internal clock signal 401. The synchronization circuitry 416 synchronizes its clock signal by comparing its own internal clock signal 401 to the external clock signals 402 and 403 and adjusting its own clock signal using, for example, a phase-locked loop, or another method known in the art. The synchronization circuitry can be implemented using hardware, software, or a combination thereof.

After an FCR fails, e.g. element 3 as depicted in FIG. 4, the FTC system transitions from triplex mode into duplex mode, and the network element in triplex state 400a transitions to duplex operation state 400b. If the fault is in the clock signal 403, the clock monitor 410 may detect the failure and cause the transition to state 400b as described above, or a clock monitor in a different network element may detect the failure first and alert the other network elements. Alternatively, if the fault in the failed network element is not related to the network element's clock signal, the voting circuit (not shown) may determine that the FCR has failed. In this case, the failure is communicated from the voting circuit to the network element and stored in the mode register 412.

When the network element 400 transitions from triplex state 400a to duplex state 400b, the clock signal 403 from the failed element is no longer used in the synchronization process. The clock monitor 410 may still be receiving clock signal 403, but the mode register 412 and switch controller 414 prevent clock signal 403 from reaching the synchronization circuitry. The switch controller 414 closes switch 422, transmitting the internal clock signal 401 to the three-way switch 426. The position of the three-way switch 426 is also changed, either by the switch controller 414 or the mode register 412, to the configuration in 400b, preventing further transmission of failed clock signal 403 and transmitting the internal clock signal 401 to the synchronization circuitry 416. Thus, the failed clock signal 403 is replaced by internal clock signal 401 in the synchronization process. As in triplex state 400a, the switch 424 stays in its default position, which allows clock signal 402 to continue to the synchronization circuitry, and the internal clock signal 401 is still directly transmitted back to the synchronization circuitry through connection 428.

Since the internal clock signal 401 that passes through connection 428 travels through a different path from the internal clock signal 401 that passes through switch controller 414 and switches 422 and 426, the two copies of the internal clock signal 401 will be slightly offset from each other in time. In one embodiment, the offset is on the order of 80 ns. The processor 416 again uses a phase-locked loop or other method known in the art to adjust its own clock signal to the inputs, i.e. the two copies of the network element's internal clock signal 401 and the external clock signal 402. In this embodiment, the synchronization circuitry in the second network element (not shown) would receive two copies of its own internal clock signal 402 and a single external clock signal 401.

Figure 5:
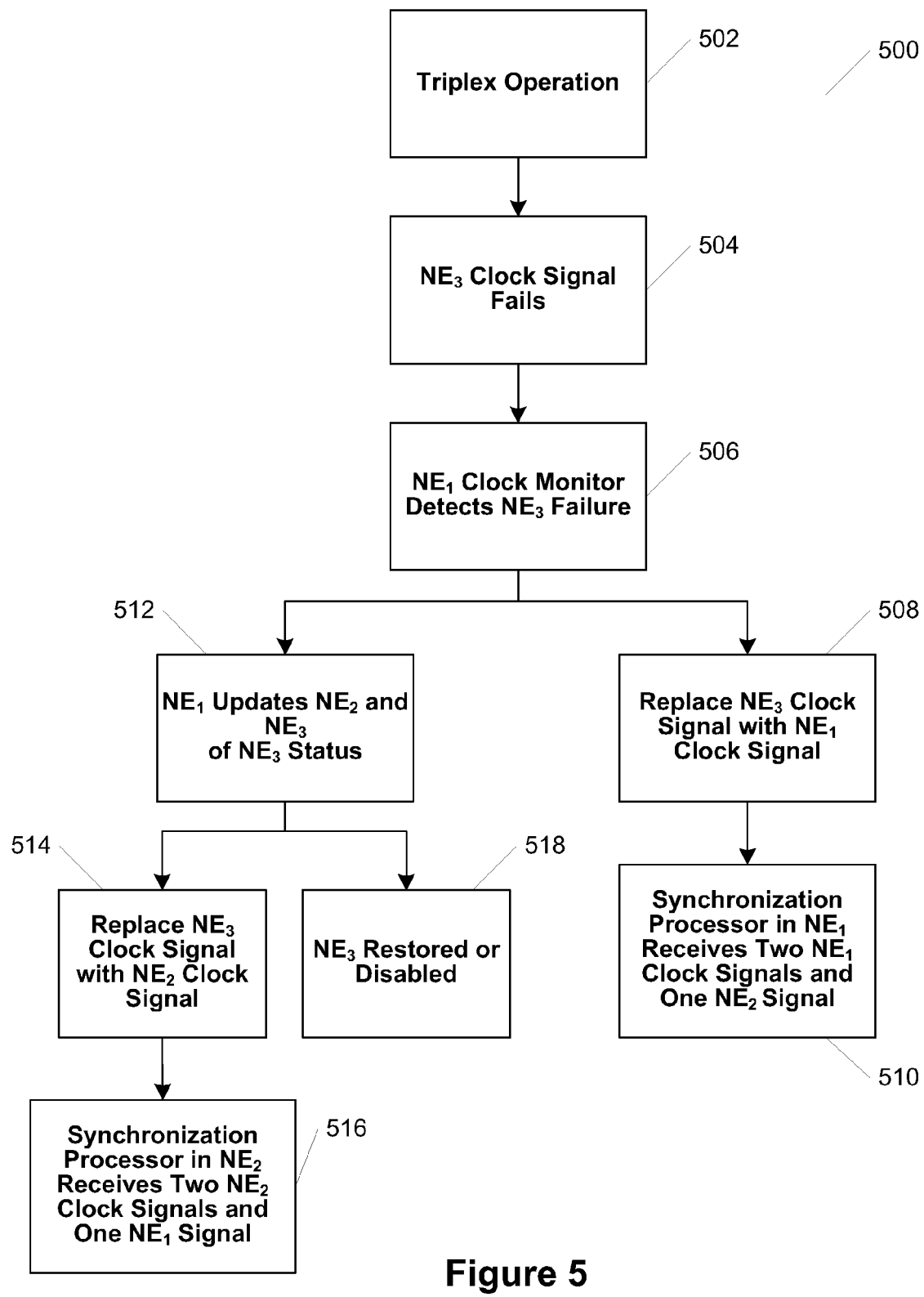
FIG. 5 is a flow diagram showing the transition from a fault-tolerant, replicated triplex computing system to a replicated duplex system, according to an illustrative embodiment of the invention.

FIG. 5 is a flow diagram showing the transition from a fault-tolerant, replicated triplex computing system to a replicated duplex system, according to an illustrative embodiment of the invention. The sequence shown in FIG. 5 begins in triplex operation 502, but higher-order replicated systems, such as the quadriplex system shown in FIG. 1, may precede step 502.

If one FCR, in this case the FCR associated with network element 3 ($NE_3$) fails (step 504), the system begins transitioning from the triplex mode to the duplex mode. In this sequence, the clock of network element 3 fails, and the clock monitor of at least one network element, in this case network element 1 ($NE_1$), detects that failure (step 506). As was discussed with respect to FIG. 4, other failures not related to the clock signal could occur and be detected by, for example, the voting circuit. In this case, the voting circuit or another monitoring element updates the mode registers of the network elements, and the functional network elements transition to duplex states as described with respect to FIG. 4.

Upon detecting the failure, the $NE_1$ clock monitor sets two sequences in motion simultaneously. Internally, network element 1 transitions to the duplex state, which was described in relation to FIG. 4. In this sequence, network element 1 replaces the $NE_3$ clock signal with its internal $NE_1$ clock signal (step 508), wherein this copy is slightly offset from the internal clock signal that is passed directly back into the synchronization circuitry. Thus, the two $NE_1$ clock signals and a single clock signal from the other operational network element, in this case network element 2 ($NE_2$), are passed to the $NE_1$ synchronization circuitry (step 510), and the synchronization circuitry uses the received clock signals to adjust its own clock in a method known in the art.

At the same time, network element 1 relays the information about the failure at network element 3 to network element 2 and network element 3 (step 512). Network element 2 transitions into its duplex operation state, replacing the failed clock signal with its own clock signal (514) and receiving at its synchronization circuitry two $NE_2$ clock signals and a single $NE_1$ clock signal for use in synchronizing its clock (step 516). When network element 3 receives notification that it has failed, the FTC system may attempt to restore the FCR. If this is not possible, the FTC system disables the FCR associated with network element 3 to conserve system resources, protect the remaining FCRs, reduce system noise, etc. (step 518).

For illustrative purposes, in FIG. 5, network element 1 detects a failure of network element 3. However, any of the three network elements could fail, and any of the three network elements may detect the failure, with the system-wide transition proceeding in a similar manner to the transition shown and described in relation to FIG. 5. Alternatively, two or three network elements may simultaneously detect the same failure and transition from their triplex states to duplex states independently, before receiving a message from another network element. Furthermore, the failed network element may detect its own failure before it is detectable to the operational network elements, and the failed network element could send messages to the remaining network elements and disable itself.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for providing replicated fault tolerant computing configured to operate in at least a triplex mode and a duplex mode, the system comprising:
   a triplet of network elements operating in the triplex mode, wherein each of the network elements includes a processor operable to:
   maintain a clock signal;
   receive as inputs its own clock signal and the clock signals from each of the other network elements; and
   provide communication operations with each of the other network elements; and
   a monitor contained within each of the network elements, the monitor configured to detect a discrepancy in the communication operations among the triplet of network elements and in response to the detection of a discrepancy:
   determine a faulty network element;
   re-configure the network elements to operate in the duplex mode without the faulty network element; and
   at each non-faulty network element, substitute the clock signal from the faulty network element with a copy of its own clock signal.

2. The system of claim 1, wherein each network element interfaces with a general purpose processor.

3. The system of claim 2, wherein each general purpose processors is configured to execute identical operations.

4. The system of claim 2, wherein the general purpose processor of each network element is in communication with the general purpose processors the other network elements.

5. The system of claim 4, wherein the communication between network elements comprises the transmittal and receipt of messages.

6. The system of claim 2, wherein the general purpose processor of a first network element is different from the general purpose processor at least one of a second network element and a third network element.

7. The system of claim 1, wherein each network element is configured to maintain synchronization of the communication operations with the at least one other network element.

8. The system of claim 1, wherein the monitor of each network element is configured to observe at least one metric associated with the clock signals.

9. The system of claim 8, wherein the metric comprises at least one of a frequency and a duty cycle of the clock signal inputs.

10. The system of claim 8, wherein each monitor is in communication with a software registry.

11. The system of claim 1, wherein the clock signal inputs maintain a time offset with respect to each other.

12. The system of claim 11, wherein the time offset is on the order of 80 nanoseconds.

13. The system of claim 1, wherein each of the network elements further comprises at least one output buffer to store messages used for the communication operations.

14. The system of claim 13, wherein the at least one output buffer is a first-in, first-out buffer.

15. A method for providing replicated computing configured to operate in at least a triplex mode and duplex mode, the method comprising:
   operating a triplet of network elements in the triplex mode, wherein each of the network elements maintains a clock signal and is operable to:
   receive its own clock signal and the clock signals from each of the other network elements; and
   communicate with each of the other network elements;
   detecting, at a first network element, a fault in the operation in a second network element; and
   switching, in response to the detection of a fault, into the duplex mode, the switching comprising:
   determining a faulty network element;
   re-configuring the network elements to operate in the duplex mode without the faulty network element; and
   at each non-faulty network element, substitute the clock signal from the faulty network element with a copy of its own clock signal.

16. The method of claim 15, the method further comprising executing identical operations at general purpose processors associated with each of the network elements.

17. The method of claim 15, the method further comprising maintaining synchronization at each of the network elements with the other network elements.

18. The method of claim 15, wherein a first network element communicating with a second network element comprises transmitting and receiving messages.

19. The method of claim 15, the method further comprising monitoring a metric associated with the clock signal inputs.

20. The method of claim 19, wherein the metric comprises at least one of a frequency and a duty cycle of the clock signal inputs.

21. The method of claim 19, wherein the monitoring further comprises maintaining a software registry.

22. The method of claim 15, wherein the clock signal inputs maintain a time offset with respect to each other.

23. The method of claim 22, wherein the time offset is on the order of 80 nanoseconds.

24. The method of claim 15, further comprising storing messages at each of the network elements in at least one output buffer.

25. The method of claim 24, wherein the at least one output buffer is a first-in, first-out buffer.

* * * * *